United States Patent [19]

Muckerheide

[11] Patent Number: 4,799,103
[45] Date of Patent: Jan. 17, 1989

[54] THREE-DIMENSIONAL LASER DRIVEN DISPLAY APPARATUS

[75] Inventor: Myron C. Muckerheide, Port Washington, Wis.

[73] Assignee: Seton Health Care Foundation, Milwaukee, Wis.

[21] Appl. No.: 917,493

[22] Filed: Oct. 10, 1986

[51] Int. Cl.⁴ .................................. H04N 13/02
[52] U.S. Cl. ............................. 358/88; 358/3; 358/231; 353/6
[58] Field of Search .............. 358/2, 3, 60, 63, 88, 358/89, 90, 231, 232; 353/6

[56] References Cited

U.S. PATENT DOCUMENTS

| | | | |
|---|---|---|---|
| 3,614,312 | 10/1971 | Fournier | 358/231 |
| 3,632,184 | 1/1972 | King et al. | 350/504 |
| 3,632,866 | 1/1972 | King et al. | 358/88 |
| 3,860,752 | 1/1975 | Adler | 358/231 |
| 3,860,950 | 1/1975 | Wick | 358/2 |
| 4,130,832 | 12/1978 | Sher | 358/89 |
| 4,213,146 | 7/1980 | Maiman | 358/63 |
| 4,290,083 | 9/1981 | Collender | 358/231 |

Primary Examiner—Tommy P. Chin
Attorney, Agent, or Firm—Dick and Harris

[57] ABSTRACT

A three-dimensional laser driven display apparatus for the controlled projection and manipulation of laser generated images toward the creation of a three-dimensional display. The apparatus comprises an image signal generator, raster generator, laser beam generator and a varifocal mirror wherein the image signal generator and raster generator spatially encode the laser beam image. The laser beam is reflected by the raster generator onto the varifocal mirror, the vibration of which serves to spatially decode the laser beam image whereby a three-dimensional image is viewable projected in space standing off of the surface of the varifocal mirror. The interposition of an imaging surface between the raster generator and the varifocal mirror causes the three-dimensional display to be viewed directly upon the surface of the vibrating varifocal mirror.

24 Claims, 2 Drawing Sheets

THREE-DIMENSIONAL LASER DRIVEN DISPLAY APPARATUS

BACKGROUND OF THE INVENTION

The present invention relates to three-dimensional displays and specifically to a three-dimensional display system which incorporates a vibrating reflective MYLAR plane upon which is projected a spatially encoded laser generated image where the vibrating reflective MYLAR plane serves to decode the laser image creating a three-dimensional display of that image.

Over time a number of apparata have been addressed to the creation of a three-dimensional image upon a two-dimensional plane, such as a projection screen or television cathode ray tube. Several of the prior art systems have incorporated varifocal mirrored surfaces to generate the three-dimensional image. The varying focal length of the mirror is typically achieved by physically vibrating the mirror about the axis perpendicular to the plane formed by the mirror. While several of these prior art systems have incorporated varifocal mirrors composed of a thin reflective MYLAR film stretched over a loudspeaker, the image projected thereon has been almost exclusively generated by a conventional cathode ray tube (CRT). In such devices, the image to be viewed in a three-dimensional fashion is provided by the cathode ray tube after having been generated in a conventional manner. The CRT image is then presented to the surface of the vibrating mirror such that the reflection of the image in the vibrating mirror is constantly swept back and forth as the mirror oscillates. The persistence of vision of the human observer causes the discrete images to fuse together, thus creating the three-dimensional display.

Such a system is described in such patents as M. C. King, U.S. Pat. No. 3,632,184; M. C. King, U.S. Pat. No. 3,632,866; and L. D. Sher, U.S. Pat. No. 4,130,832. Unfortunately however, such prior art imaging apparata which rely upon a CRT to present the image to the vibrating mirror have experienced drawbacks which make such systems wholly inadequate in certain applications. The limitation of such prior art systems stems from the use of the CRT to originate and project the desired three-dimensional image. It will be recognized by those skilled in the art that the image appearing to an observer on the surface of the CRT is made possible because the phosphor material lining the interior of the CRT glows upon being struck by the electron beam generated within the tube. It is because of the persistence of these phosphors, i.e. the lag time during which the phosphor continues to glow after the electron beam passes, that the observer is able to view the complete image since the electron beam is constantly sweeping across the CRT striking only a single point at any given time. Absent the persistence of the phosphors only a single point on the CRT would be illuminated at any time. Since the time to scan the entire face of the CRT exceeds the viewer's persistence of vision a poor display would result but for the phosphor lag time. It should also be noted that certain high brightness phosphors may have decay patterns which exceed the moment of observation by many orders of magnitude. It is this phosphor persistence and lag time, which makes such prior art systems unsuitable for certain applications as long lag times may occur when it is essential to erase the image being presented. The inherent limitation of such prior art systems stemming from the phosphor to mirror interface and the associated flouresing lag time makes it difficult to instantly erase the image appearing on the CRT and thus the displayed three-dimensional image. While advances have been made in the development of "high speed" CRTs which minimize the phosphor lag time, while still providing sufficient persistence to permit normal viewing, the fluoresing lag time present in such "high speed" CRTs is nevertheless still so long as to prohibit erasure of the display as desired. In addition to the erasure problem, the lag time present in the CRT interface seriously limits the resolution of the three-dimensional display produced since fewer complete images can be generated within a given time period due to the time required by the CRT to sweep out a complete screen.

It can be seen that the CRT's inability to erase the image presentation with sufficient speed may make such systems unsuitable for applications where the image being viewed changes rapidly and the ability to isolate and otherwise view such change is critical.

The three-dimensional laser driven display apparatus disclosed herein has application in many areas. For example, the three-dimensional laser driven display apparatus may be used in air traffic control tower settings where the data pertaining to an approaching aircraft's glide path and relative position coordinates may both be viewed upon a single three-dimensional display rather than requiring the air traffic controller to view two separate radar screen images as is currently the practice. The present invention similarly has great usefulness in the area of "head-up" displays, particularly in military jet fighters where a three dimensional display of a target or an incoming missile and the selective display capabilities of the present invention can greatly enhance the fighter and pilot's performance. Still further, the ability of the present invention to project and display a three-dimensional image in space apart from a fixed two-dimensional projection screen makes possible the creation of decoy objects. Through the present invention for example, military hardware or even troops may be projected onto a battlefield and viewed as if they were actually there when in fact no physical object exists. Still further, decoy aircraft could be made to appear in flight when none are present. Of significant potential is the ability to operate the data acquisition facet of the present invention with an infrared laser which can serve, in certain circumstances, to overcome the stealth capability of modern military aircraft and ships. The ability to acquire image data and display corresponding three-dimensional images has powerful medical applications in the area of exploratory medicine. The present invention also has application in the field of cryptography as a cryptographic generation device due to its flexible sophisticated encoding and decoding capabilities.

Accordingly it is the object of the present invention to provide a three-dimensional laser driven display apparatus which utilizes laser beams as the principal image source which is viewed using a vibrating mirror structure, thereby eliminating the CRT's phosphor dependency and permitting instant erasure of the image and observation of minute changes therein.

It is additionally an object of the present invention to provide such a three-dimensional system where the pulse width of the laser and the spatial interactions permit a point to be located on the vibrating mirror which is presented in an exact phase condition with the image signals driving the laser.

It is a further object of the present invention to provide laser beams of different colors where various colored laser beams may be combined with one another to generate blanking techniques which can eliminate or alternatively enhance specific characteristics of the three-dimensional presentation.

An additional object of the present invention is to provide for the projection of a three-dimensional laser driven display offset from the varifocal mirror means.

Yet a further object of the present invention is to provide for the viewing of the three-dimensional laser driven display directly upon the varifocal mirror means through the use of an intermediate imaging surface means.

It is yet another object of the present invention to provide a data acquisition mechanism which utilizes fiber optics permitting exploration of cavities of the human body towards the three-dimensional viewing thereof.

It is another object of the present invention to provide such a three-dimensional system which incorporates a reflective MYLAR mirror having ferrite material deposited thereon such that an electron beam sweep may produce magnetic attenuation of the mirror toward the selective enhancement or modification of the three-dimensional image being reflected therefrom.

It is yet another object of the present invention to provide such a three-dimensional system which includes a MYLAR film having phosphor material deposit thereon where such phosphor material is sensitive to selective x-ray or ultraviolet light so as to permit the use of non-visible lasers.

As a further object of the present invention, an imaging surface may be provided to cut the level of laser radiation or otherwise non-optically control or modify the image to be displayed.

Still another object of the present invention is to provide a three-dimensional system incorporating a vibrating mirror assembly which includes laser detectors to permit the modification or enhancement of the three-dimensional image as a function of the color, frequency, phase or power of the laser image reflecting off of the MYLAR film.

It is yet a further object of the present invention to provide image enhancement techniques whereby various waveforms as well as standing waves may be generated upon the reflective MYLAR film to alter the spatial characteristics of the three-dimensional display.

These and other objects of the invention will become apparent in light of the present specification and drawings.

SUMMARY OF THE INVENTION

The present invention comprises a three-dimensional laser driven display apparatus for the controlled projection and manipulation of laser generated images toward the creation of a three-dimensional display.

Briefly stated, the apparatus comprises an image signal generation means, a raster generation means, laser means and a varifocal mirror means wherein the image signal generation means produces image control signals which drive the raster generation means causing it to reflect the laser projected thereon in a raster scanning pattern. The laser image is thereby spatially encoded. The laser image is thereafter reflected upon a varifocal mirror means which includes a vibrating reflective plate sweeping out an image space causing the successively reflected images to be spatially decoded and viewed by an observer as a three-dimensional image as a result of the viewer's persistence of vision.

Specifically, an image generation means is provided for producing image control signals which themselves are a function of the image to be ultimately displayed in a three-dimensional fashion. This image generation means may comprise a plurality of conventional frequency generators which serve to generate image control signals determined by algorithms which implement the three-dimensional image encoding.

Raster generation means are operably and electrically connected to the image signal generation means. The raster generation means serves to cause the laser means which is projected thereon to be reflected in a raster-scanned pattern. It is this raster pattern which will ultimately determine the image to be displayed. In the preferred embodiment of the invention, the laser means is capable of generating coherent visible light or coherent invisible light which is projected upon the raster generation means and thereby reflected toward the formation of the three-dimensional display. It is contemplated, and within the scope of this invention, that the use of non-visible lasers, such as those operating in the X-ray, ultraviolet or infrared ranges would be desirable and useful in various applications.

A varifocal mirror means is provided upon which the three dimensional display is ultimately viewed after the laser beam image reflected by the raster generation means is projected upon an imaging surface means interposed between the raster generation means and varifocal mirror means. Absent the interposition of the imaging surface means, the three-dimensional image will be viewed standing off of the surface of the mirror. This varifocal mirror means includes a reflective plate means and a motion control means where the reflective plate means is controllably moved about an axis perpendicular to the plate under direction of the motion control means. The vibration of the reflective plate creates a plurality of reflective surfaces parallel with one another in a region defined as an image space. The laser encoded image projected on the reflective place thus appears at successive image planes corresponding to the position of the reflective plate means within the image space at each instant in time. The phase relationship between the encoding of the laser image and the movement of the reflective plate from one image station to another causes the laser image to be spatially decoded. The observer's persistence of vision thus causes the successively generated image components to fuse together creating the three-dimensional display.

The use of the laser means to provide the display image overcomes the limitations encountered in imaging apparata which rely upon CRTs to present an image to the varifocal mirror. In particular, it can be seen that the vibrating mirror results in an image space which is composed of discrete mirror stations corresponding to each instant in time. The lag time required by the CRT to erase one image and display the next limits the resolution which may be achieved since numerous image stations are missed while the CRT image is in transition. The use of a laser means as the image source permits vastly more image stations of the mirror to be accessed since the laser means is capable of operating up in the sub-nanosecond, picosecond and on up into the femtosecond range. Accordingly, many more discrete image components may be generated with the use of the laser means thus vastly increasing the resolution of the display generated.

Specifically, the pulse width of the laser means and the spatial interaction of the laser causes the image to locate at a point on the vibrating varifocal mirror means in an exact phase condition with the image control signals used to generate the display.

In a preferred embodiment of the invention, the three-dimensional laser driven display includes a signal processor means operably and electrically connected to the image generation means and to the raster generation means. This signal processor means serves to electronically amplify and modify the image control signals to, in turn, modify the three dimensional display through the selective enhancement of desired features and/or portions of the display as it ultimately appears in a three-dimensional manner.

The preferred embodiment of the invention further includes synchronization means which are operably and electrically connected to the varifocal mirror means and to the image signal generation means to synchronize the motion of the varifocal mirror means with the pulse width of the laser beam. This synchronization provides for the removal of unwanted optical aberations and further serves to increase the clarity of the three-dimensional image being observed in the varifocal mirror means.

In one embodiment of the invention, the three-dimensional laser driven display apparatus includes an imaging surface means which is operably positioned between the raster generation means and the varifocal mirror means such that the spatially encoded laser image which is reflected by the raster generation means may be then projected upon the imaging surface means, or through the imaging surface if translucent. Accordingly, the spatially encoded laser image appearing on the imaging surface means is viewed in the varifocal mirror means rather than offset from the surface of the varifocal mirror means. This imaging surface means additionally serves to non-optically modify the three dimensional image and control the level of laser radiation which reaches the display surface of the three-dimensional display apparatus.

In another embodiment of the invention, the three-dimensional laser driven display apparatus includes data acquisition means operably connected to the image signal generation means. The data acquisition means serves to transmit to the image generation means image data corresponding to the image sought to be displayed so that the image may be displayed in a three-dimensional manner. Image storage means may be provided for magnetically storing the image data gathered by the data acquisition means. The image storage means is operably and electrically connected to the image generation means permitting the retrieval of the image signals towards the delayed display of the three-dimensional image as would be desirable in cryptographic applications.

In the preferred embodiment of the invention, the raster generation means comprises a first raster assembly. This assembly includes a first galvanometer portion and a first mirror portion, the first galvanometer portion being operably and electrically connected to the image signal generation means. The laser means is directed toward the first mirror portion and reflected to the varifocal mirror means. The first galvanometer means serves to cause the first mirror portion to move in a first axis where this movement is a function of the image control signals received. Accordingly, the reflected laser image is projected on the varifocal mirror means in a raster scanned pattern.

As the application requires, the preferred embodiment of the invention may include a second raster assembly which includes a second galvanometer portion and a second mirror portion where the second galvanometer portion is operably and electrically connected to the image signal generation means. The second mirror portion serves to receive the laser beam image projected from the first mirror portion of the first raster assembly, and reflects the laser beam image to the varifocal mirror means. The second galvanometer serves to cause the second mirror portion to move in a second axis where the movement is similarly a function of the image signals. Accordingly, the laser beam image is reflected about two axes such that the reflected image is projected upon the varifocal mirror means in a raster scanned pattern toward the formation of a complete three-dimensional image.

It is contemplated and fully within the scope of this invention, that the raster generation means may be comprised of rotating reflective prism assemblies, etalons, q-switches, or combinations thereof. It is further contemplated that the raster generation means may comprise a saturable dye matrix which serves to present the laser image to the vibrating varifocal mirror means. In yet another embodiment of the invention, it is contemplated that a fiber optic array capable of projecting the spatially encoded laser image will be used to direct the laser image to the varifocal mirror means.

In an alternative embodiment of the invention, a plurality of colored laser beam emitters and corresponding number of raster generation means are provided wherein different color combination of laser beams may be directed upon the varifocal mirror means. The use of different colored laser beams permits the colored laser beams to be combined with one another to affect blanking, to, in turn, enhance or cancel specific characteristics of the three-dimensional image being displayed.

It is additionally within the scope and contemplation of this invention that the laser means may be modulated to further encode the laser beam image. Furthermore, additional laser beam means may be incorporated into the apparatus wherein for example a second laser means of a color different than the first laser means may be directed upon the second mirror portion of the second raster assembly towards further modifying or enhancing the three dimensional image to be displayed.

It is still further contemplated that a laser generated television device may be used as an image generation mechanism device for presenting the image to the varifocal mirror means for decoding into a complete three-dimensional display.

In the preferred embodiment of the invention, the varifocal mirror means comprises a reflective MYLAR film stretched over an audio loudspeaker. The MYLAR film is accordingly acoustically coupled to the loudspeaker such that when the loudspeaker is driven the reflective MYLAR film will vibrate. This vibration will deflect the MYLAR film from its rest position thereby causing the laser image reflected viewed in the MYLAR film to appear at successive image planes corresponding to the position of the vibrating MYLAR film at each instant in time. Consequently, when the encoded image is projected upon the vibrating MYLAR film, the vibration decodes the laser image reconstructing the spatial information. The persistence of vision of the human observer causes the successive reflective images to fuse together such that the decoded image appears as a three-dimensional display. It has been found that the most advantageous operation of loudspeaker is achieved when it is driven in the range of 15 to 60 Hertz. It is contemplated however that certain applications may require that the loudspeaker be driven at ultra-low frequencies as well as at much higher frequencies.

It is apparent that the coordination required between the operations of encoding of the laser image and decoding the image with a varifocal reflective mirror which is necessary to produce a three dimensional image results in the present invention being readily adaptable for use as a cipher device. Data may therefore be encrypted, transmitted and decoded in much the same way as the three-dimensional laser beam images are manipulated as taught herein.

In one embodiment of the invention, the varifocal mirror means includes an enhancement means wherein the loudspeaker includes ports positioned about the periphery of the loudspeaker cone to permit certain wavelengths of laser light to pass therethrough. Laser detectors are provided for positioning behind the loudspeaker, proximate to the ports where the laser detectors may serve to detect the presence and condition of the laser image reflected onto the reflective MYLAR film. Air pressure modules are in turn connected to the interior of the loudspeaker such that the air pressure modules may produce and sustain a variety of waveforms as well as a standing wave within the loudspeaker cone to selectively enhance and modify the laser image as a function of image reflected onto the MYLAR film. A circuit means is provided for connection to each of the laser detector means and air pressure modules for activating the air pressure modules in response to the conditions detected by the laser detector means. These air pressure modules permit the generation of standing waves within the loudspeaker cone which can enhance or modify the three-dimensional image independent of any variation in the operation of the loudspeaker.

In another embodiment of the invention the laser detector means may be positioned external to the varifocal mirror means in front of said reflective MYLAR film and aimed such that the condition of the laser beam image may be determined by the reflection off of the film. It is contemplated that the laser detector means may comprise line diodes which are capable of detecting the presence or absence of specific colors to thereby enhance selected features of the display and alter the spatial characteristics of the display. The laser detector means thereby feed back their signals to the air pressure modules which in turn generate the appropriate waveform to enhance or otherwise modify the three dimensional display as a function of the laser beam image reflected by the MYLAR film.

The varifocal mirror means, in an alternative embodiment of the invention, comprises a frame means upon which the reflective MYLAR film is stretched. An infrared laser source means is positioned behind the MYLAR film whereby the MYLAR is thermally contracted by application of the infrared source means. The inherent memory of the MYLAR film serves to cause the film to relax and return to its initial shape when the infrared laser source is deactivated, as long as the bursts of the infrared source means are of proper power and wavelength. The pulsed application of the infrared source means will serve to cause the MYLAR film to vibrate such that the reflection viewed therein will appear at successive image plane corresponding to the position of the MYLAR film at each instant in time equivalent to the operation loudspeaker embodiment of the varifocal mirror means.

In one embodiment of the varifocal mirror means, a ferrite material is operably affixed to the back non-reflecting surface of the MYLAR film by vacuum depositing the ferrites thereon. Magnetic attenuation of the MYLAR film may be accomplished by an electron beam sweep of the MYLAR film which will produce dwell periods in the time motion deflection of the MYLAR film which, in turn, will cause manipulation of the image being reflected thereon as would be useful in stress simulation applications as well as in cryptographic applications. It is preferred that the electron beam be contained in a vacuum or helium gas environment in order that its attenuation properties be fully realized.

In another embodiment of the varifocal mirror, the reflective MYLAR film includes phosphor material vacuum deposited on the reflected surface on the MYLAR film. This application of phosphor material permits the observation of images generated by laser beams working beyond the visible light range. For example, phosphor material which is sensitive to x-rays may be deposited on the MYLAR film whereby the non-visible x-ray images may be viewed as a three-dimensional image. Similarly, phosphor material which is sensitive to ultra-violet light may be deposited on the reflective surface of the MYLAR film whereby the non-visible ultra-violet images projected thereon may be reviewed as a three-dimensional image.

In order to further provide for the control and manipulation of the three-dimensional image, it is contemplated that one embodiment of the invention may include enhancement control means wherein the loudspeaker contains a plurality of ports operably positioned about the periphery of the loudspeaker cone. These ports permit certain wavelengths of laser light projected upon the MYLAR film to pass therethrough. A plurality of laser detectors operably positioned behind the loudspeaker proximate to the respective ports serve to detect the presence and condition of the laser light reflecting off of the MYLAR film. A circuit means is operably and electrically connected to each of the laser detector means and the loudspeaker means wherein the circuit means serves to electronically alter the vibration of the loudspeaker to, in turn, alter the vibration of the reflective MYLAR film. Through such a configuration, the three-dimensional display may be modified in response to the frequencies, phase and power of the laser image. In addition, lens means may be operably positioned about each of the ports to enhance the detection ability of the laser detector means by concentrating or otherwise focusing the laser passing through the reflective MYLAR film.

In an alternative embodiment of the invention, the imaging surface means includes a coating of material which is sensitive to the wavelength of the laser means utilized therewith, whereby the laser image projected thereon may be modified as a function of the sensitivity of the material covering the imaging surface means. For example, a radiation absorbent material covering the imaging surface may serve to reduce the radiation reflected and minimize its presence at the ultimate display surface, namely, the varifocal mirror means. The position and particular angle at which the surface is interposed between the raster generation means and the MYLAR film can similarly affect a change in size of image or reverse its orientation. The imaging surface may be composed of a translucent material as well as opaque materials.

In one embodiment of the invention the data acquisition means comprises a plurality of fiber optic elements capable of being inserted in a cavity, such as a human body and into a artery, lung or other organ. At least one fiber optic element directs a laser beam to illuminate the interior of a cavity. The high brightness characteristic of the laser beam makes such an application possible. At least one fiber optic element is provided for conducting the reflected laser beam to the three-dimensional laser driven display apparatus such that a three-dimensional image of the object is displayed.

In operation, the embodiment of the invention which omits the imaging surface means interposed between the varifocal mirror means and the raster generation means results in producing a three-dimensional display which is projected off of the surface of the mirror means into space. This is, in part, due to the operation of the Tyndall effect whereby an image appears in space as a result of the presence of dust particles in the air, however small they may be, which reflect light thereby making the image visible. The computerized algorithms and pulse with designations of the laser serve to generate an image at the focal station of projection.

DETAILED DESCRIPTION OF THE DRAWINGS

While this invention is susceptible of embodiment in many different forms, there is shown in the drawings and will herein be described in detail one specific embodiment, with the understanding that the present disclosure is to be considered as an exemplification of the principles of the present invention and is not intended to limit the invention to the embodiment illustrated.

Figure 1:
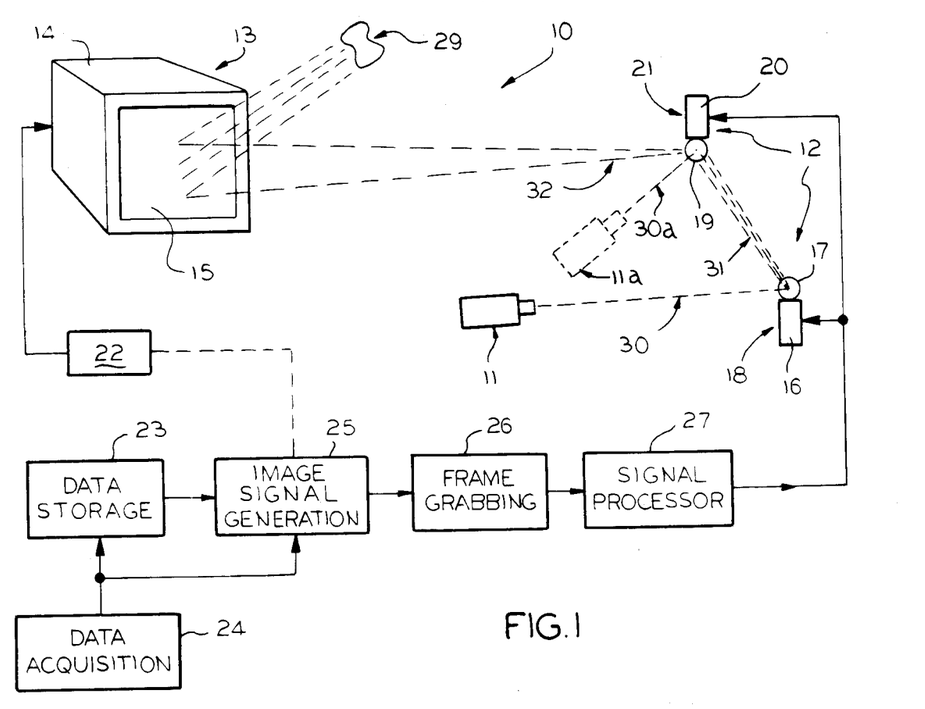
FIG. 1 of the drawings is a schematic representation of the preferred embodiment of the three-dimensional laser driven display apparatus specifically illustrating the projection of the laser onto the raster generation means and reflection of the laser generated image therefrom onto the varifocal mirror wherein the three-dimensional display is viewed standing off of the mirror surface.

FIG. 1 of the drawings is a schematic representation of the preferred embodiment of the three-dimensional laser driven display apparatus 10 specifically illustrating the projection of the laser 11 onto the raster generation means 12 and reflection of the raster generated image 32 onto the varifocal mirror 13. The video acquisition module 24 is shown connected to the data storage module 23 as well as the image signal generation module 25 as the image generation may be derived from data previously stored in the storage module 23, or alternatively may be performed simultaneously with the acquisition of the data utilized to generate the three-dimensional image 29. The image signal generation module 25 is shown connected to the frame grabbing module 26. The frame grabbing module 26 may be employed to "grab" a single image from the successively generated images produced by the image signal generator 25 for further processing and viewing thereof. The frame grabbing module 26 is shown connected to the signal processor module 27. The signal processor module 27 includes amplifier devices to attenuate the signal as required. The signal processor is shown connected to raster assemblies 18 and 21. Raster assemblies 18 and 21 are shown comprising mirror portions 17 and 19 and galvanometer portions 16 and 20 where mirror portions 17 and 19 serve to reflect the laser image projected thereon and galvanometer portions 16 and 20 serve to move mirror portions 17 and 19 in response to signals received from the image signal generator 25. Specifically, the first raster assembly 18 is shown comprising first mirror portion 17 and a first galvanometer portion 16. The laser 11 is shown projecting its beam 30 upon the first mirror portion 17 of the first raster assembly 18. This laser image 30 is then reflected by the first mirror portion 17 of the first raster assembly 18 onto the second mirror portion 19 of the second raster assembly 21. It can be seen that that motion of the first mirror portion 17 causes the laser image 31 to be distributed about the surface of the second mirror portion 19 of the second raster assembly 21. The second raster assembly 21 is shown reflecting the laser image 32 onto the varifocal mirror 13. The first raster assembly 18 moves about a first axis while the second raster assembly 21 moves about a second axis such that the laser generated image 32 which ultimately reflected upon the varifocal mirror 13 is generated via the raster-scanned pattern. The varifocal mirror 13 comprises a MYLAR film 15 stretched about a loudspeaker cone (not shown) contained within cabinet 14. The loudspeaker is driven by the synchronization module 22 which actuates the vibration of the MYLAR film 15 and synchronizes the vibrations to preserve the phase relationship between the vibrating reflective MYLAR surface 15 and the laser image 32 being projected thereon. Synchronization module 22 is shown electrically connected to image signal generation module 25 from which phase information is acquired. In the embodiment illustrated, the three-dimensional image 29 is projected by the reflective MYLAR film 15 wherein the image 29 is viewed standing off of the surface of MYLAR 15. Additionally illustrated in FIG. 1 is an alternative embodiment of the invention which incorporates a second laser means 11a projecting its beam 30a upon raster assembly 21. This laser means 11a may be of a color different from laser means 11 to thereby effect blanking.

Figure 2:
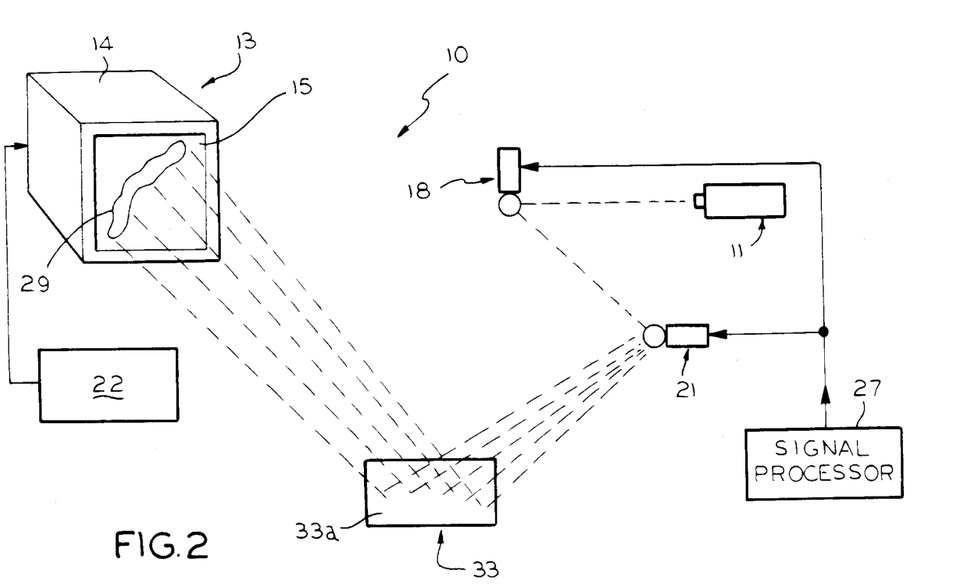
FIG. 2 of the drawings is a schematic representation of three-dimensional display apparatus illustrating the use of an imaging surface to receive the laser generated image from the raster generation means and the viewing thereof upon the varifocal mirror.

FIG. 2 of the drawings illustrates the use of an imaging surface 33 to modify the laser generated image and ultimately the three-dimensional display 29. The imaging surface 33 is shown interposed between the second raster assembly 21 and the varifocal mirror 13. In operation, the laser is reflected off of the first raster assembly 18 and then the second raster assembly 21 after which the laser image strikes the imaging surface 33. The varifocal mirror 13 is then positioned such that the imaging surface 33 may be viewed thereon. This imaging surface may thus serve to non-optically modify the laser generated image as a function of the coatings applied to the surface 33. It is contemplated that various laser absorbing compounds 33a may be applied to the surface to reduce the amount of laser radiation which reaches the varifocal mirror 13 or imaging surface 33. It can be seen that the physical orientation of the laser 11, first and second raster assemblies 18 and 21 imaging surface 33 and varifocal mirror 13 may serve to non-optically affect the size of the laser image ultimately projected upon the varifocal mirror 13 or even completely reverse that image. In this embodiment, the addition of the imaging surface 33 results in the three-dimensional image 29 being viewed by the observer directly on the reflective MYLAR film 15 rather than offset therefrom.

Figure 3:
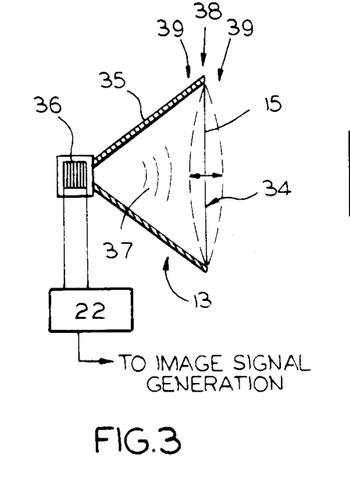
FIG. 3 of the drawings is a cross-sectional view of the varifocal mirror specifically illustrating the acoustic coupling of the MYLAR film to the loudspeaker and the generation of successive image planes formed by deflection of the MYLAR due to the actuation of the loudspeaker.

A cross-sectional view of the varifocal mirror assembly 13 is illustrated in FIG. 3. The MYLAR film 15 having a reflective surface 34 is shown stretched across the opening of a conventional loudspeaker cone 35. Accordingly, the reflective MYLAR film 15 is acoustically coupled to the loudspeaker cone 35 such that vibrations of the coil 36 and generations of pressure waves 37 within the cone 35 will serve to cause the reflective MYLAR film 15 to vibrate from its stationery rest position 38 such that the reflective MYLAR surface 15 alternates between a convex and concave orientation and thus is in a different lateral position 39 at any moment in time. The synchronization control device 22 is shown electrically connected to the loudspeaker coil 36, for controlling the vibration of the reflective MYLAR surface 15 and providing phase control over the three dimensional display, the phase information being derived from the image signal generation module 25.

Figures 4, 5:
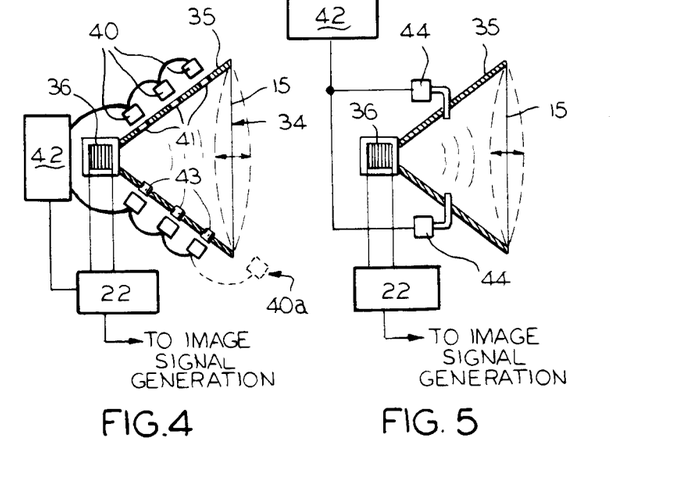
FIG. 4 of the drawings is a cross-sectional view of the varifocal mirror illustrating the use and positioning of laser detectors to detect the laser and control the loudspeaker in response to the properties of the laser.
FIG. 5 of the drawings is a cross-sectional view of the varifocal mirror illustrating the use and positioning of air pressure modules to create waveforms within the loudspeaker cone.

FIG. 4 of the drawings illustrates a cross-sectional view of the varifocal mirror 13, of FIG. 1, specifically illustrating the inclusion of laser detectors 40. The loudspeaker cone 35 is shown having ports 41 formed therein providing access to the interior of the speaker cone 35. Laser detectors 40 are shown positioned proximate to the respective ports 41. These laser detectors 40 are capable of detecting the phase, frequency and power of the wavelength of the laser penetrating the MYLAR film 15. The laser detectors 40 are shown connected to a control circuit 42 which itself is connected to the synchronization control device 22. Accordingly, the vibration of the speaker cone 35, and hence the deflection of the reflective MYLAR film 15 may be varied as a function of the properties of the laser image striking the MYLAR film 15. It is contemplated that the ports 41 themselves will be sealed with a material which permits the penetration of the laser light while maintaining the integrity of the loudspeaker cone 35 so as to preserve the acoustic coupling. A lens device 43 is shown installed in a port. This lens device 43 may serve to concentrate or otherwise focus the laser image to the laser detector 40 to enhance or otherwise control the detector's 40 efficiency. An alternative placement of the laser detectors is illustrated by laser detector 40a which is shown positioned in front of the reflective MYLAR film 15 where it may receive the reflective image and transmit signals to control circuit 42 as a function of the image.

FIG. 5 of the drawings is a cross-sectional view of another embodiment of the varifocal mirror 13 of FIG. 1. Air pressure modules 44 are illustrated connected to the interior of loudspeaker 35. Air pressure modules 44 are activated by circuit 42 which is connected to laser detectors 40, not shown. Accordingly, the activation of air pressure modules 44 serve to create waveforms as well as standing waves within the interior of loudspeaker cone 35 to further alter the image reflecting off of MYLAR 15 independent of the vibration of the MYLAR 15 caused by coil 36.

Figure 6:
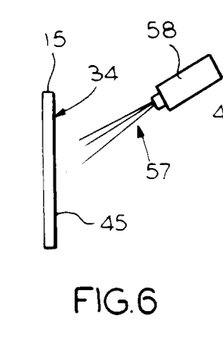
FIG. 6 of the drawings is a cross-sectional view of the MYLAR film specifically illustrating the application of phosphor material to the reflective surface of the MYLAR film and projection of x-ray images thereon.

FIG. 6 of the drawings is a cross-sectional view of the MYLAR film 15. A phosphor material 45, is shown applied to the reflective surface 34 of the MYLAR film 15. It is contemplated that this phosphor material 45 will be of the type sensitive to non-visible radiation, such as x-ray or ultraviolet light emissions 57 generated by laser source 58. Accordingly, the use of laser 58 operating the x-ray or ultraviolet spectrum may be utilized as the phosphor 45 coated MYLAR film 15 will cause the non-visible laser generated images to be observable by the human eye.

Figure 7:
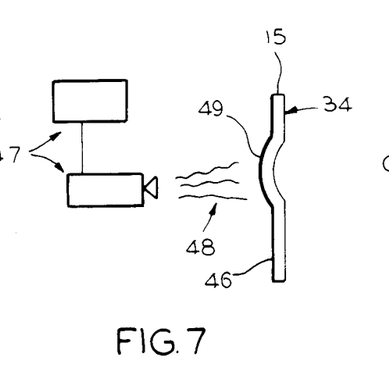
FIG. 7 of the drawings is a cross-sectional view of the MYLAR film specifically illustrating the application of ferrite material to the rear facing surface of the MYLAR film and the attenuation of the MYLAR film caused by application of an electron beam.

A further attenuation scheme is shown in FIG. 7. Specifically a ferrite material 46 is shown operably affixed to the rear facing surface of the MYLAR film 15. An electron beam generator device 47 is shown scanning a portion of the MYLAR film 15. The electron beam 48 striking the ferrite material 46 will cause magnetic attenuation therebetween such that selected portions 49 of the MYLAR film 15 may be attenuated so as to modify select portions of the three-dimensional display as will be useful in the simulation of, for example, stress forces upon an object.

Figure 8:
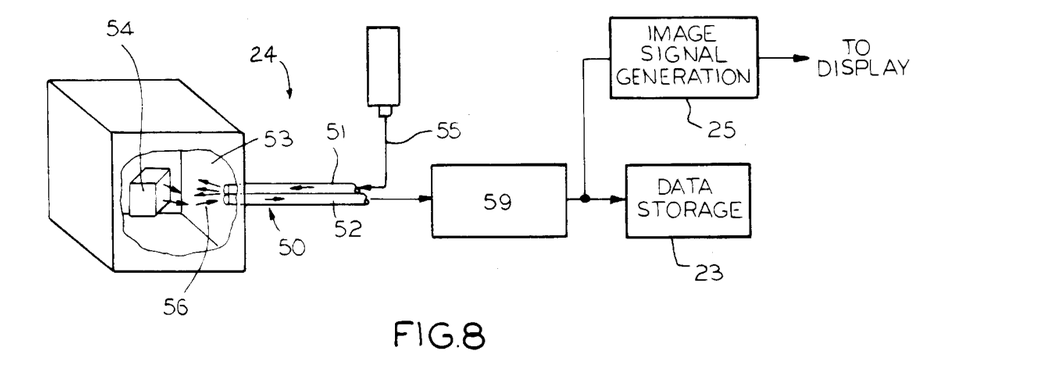
FIG. 8 of the drawings is a schematic representation of a fiber optic assembly specifically shown viewing a three-dimensional object located within a closed cavity.

FIG. 8 of the drawings is a schematic representation of a data acquisition system 24 incorporating fiber optics 50. Specifically, the fiber optic pair 50 is shown inserted into a closed cavity 53 in which is located a three-dimensional object 54 to be viewed. The first fiber optic 51 serves to transmit a laser beam 55 having the desired level of brightness necessary to illuminate the interior of the cavity 53. The second fiber optic 52 serves to conduct the laser image 56 as it is reflected off of the three-dimensional object back to a processor module 59 which serves to convert the laser light image to an electrical signal. This processor module 59 is shown connected to the storage module 23 as well as the image signal (encoder) module 25 so as to provide for either the on-line, real time observation of the three-dimensional image or the storage of that image data for later viewing.

Figure 9:
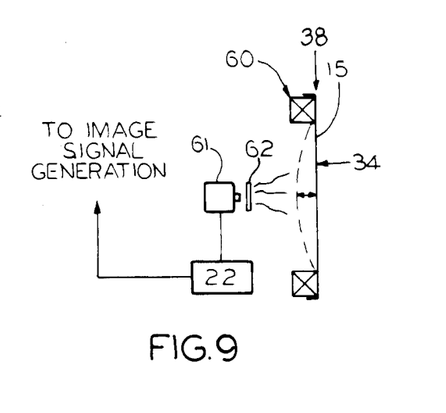
FIG. 9 of the drawings is a cross-sectional view of an alternative embodiment of the varifocal mirror means.

FIG. 9 of the drawings is a cross-sectional view of an alternative embodiment of the varifocal mirror means illustrating reflective MYLAR film 15 stretched over frame means 60. An infrared laser means 61 and diffusing lens means 62 is shown positioned behind reflective MYLAR film 15 such that when infrared laser means 61 is pulsed, film 15 contracts due to the thermal effect of the diffused infrared laser light. When infrared laser means 61 is switched off reflective MYLAR film 15 relaxes and returns to its rest position 38. Pulsing of the infrared laser means 61 thus causes MYLAR film 15 to vibrate within an image space. Infrared laser means 61 is additionally shown connected to synchronization module 22 which in turn is connected to image signal generation module 25 (now shown).

The foregoing description and drawings merely explain and illustrate the invention and the invention is not limited thereto, except insofar as the amended claims are so limited as those skilled in the art who have the disclosure before them will be able to make modifications and variations therein without departing from the scope of the invention.

What is claimed is:

1. A three-dimensional laser driven display apparatus for the controlled projection, display and manipulation of laser generated images towards the creation of a three dimensional display, said three-dimensional display apparatus comprising:

image signal generation means for producing image control signals which correspond to said laser generated image to be displayed;

raster generation means operably and electrically connected to said image signal generation means, said raster generation means operating as a function of said image control signals produced by said image signal generation means to cause said laser generated image to be spatially encoded, said raster generation means thereby reflecting said spatially encoded laser generated image in a raster scanned pattern towards the formation of said complete three-dimensional display;

laser means for generating a coherent beam of light which is projected upon said raster generation means and reflected by said raster generation means towards the formation of said three-dimensional display;

varifocal mirror means upon which said spatially encoded laser generated image is reflected after being reflected by said raster generation means, said varifocal mirror means serving to, in turn, reflect and project said three-dimensional display such that said three-dimensional display is viewable in space standing off of the surface of said varifocal mirror means, said varifocal mirror means including a reflective plate means and a motion control means where said reflective plate means is moved about an axis perpendicular to the plane formed by said reflective plate means, the movement of said reflective plate means being controlled by said motion control means such that said reflective plate means sweeps out an image space whereby said spatially encoded laser generated image projected thereon appears in successive planes as a function of the position of said reflective plate means at each instant in time thus spatially decoding said spatially encoded laser generated image to create said three-dimensional display.

2. The three-dimensional laser driven display apparatus according to claim 1 further comprising signal processor means operably and electrically connected to said image signal generator means for electronically amplifying and modifying said image control signals to, in turn, modify said three-dimensional display.

3. The three-dimensional laser driven display apparatus according to claim 1 further comprising an imaging surface means operably positioned between said raster generation means and said varifocal mirror means such that said spatially encoded laser generated image reflected by said raster generation means is projected upon said imaging surface means whereby said spatially encoded laser generated image projected thereon may be viewed in said varifocal mirror means rather than in space, standing off of said varifocal mirror means, said imaging surface means further serving to nonoptically modify said three-dimensional display and control the level of laser radiation appearing at said varifocal mirror means.

4. The three-dimensional laser driven display apparatus according to claim 3 in which said imaging surface means comprises a surface of material sensitive to the wavelength of said laser means whereby said image projected thereon may be modified as a function of the sensitivity of the material covering said imaging surface means.

5. The three-dimensional laser driven display apparatus according to claim 1 further comprising data acquisition means operably connected to said image signal generation means, said data acquisition means serving to transmit to said image signal generation means image data corresponding to said three dimensional laser generated display.

6. The three-dimensional laser driven display apparatus according to claim 5 further comprising image storage means operably and electrically connected to said image signal generation means for magnetically storing said image data produced by said data acquisition means thereby permitting the future viewing of said three-dimensional display.

7. The three-dimensional laser driven display apparatus according to claim 5 in which said data acquisition means comprises a plurality of fiber optic elements capable of being inserted into a cavity wherein at least one fiber optic element directs a coherent beam of light to illuminate the interior of said cavity said coherent beam of light being reflected therein and wherein at least one fiber optic element conducts the reflected coherent beam of light to said image signal generation means.

8. The three-dimensional laser driven display apparatus according to claim 1 further comprising frame grabbing means operably and electrically connected to said image signal generation means and said raster generation means for permitting the continuous display of a single image from the images at successive planes produced by said image signal generation means.

9. The three-dimensional laser driven display apparatus according to claim 1 further comprising synchronization means operably and electrically connected to said motion control means to synchronize the motion of said reflective plate means of said varifocal mirror means with the pulse width of said laser means to remove unwanted optical aberations and increase the clarity of said three-dimensional display.

10. The three-dimensional laser driven display apparatus according to claim 1 in which said raster generation means comprises a first raster assembly including a first galvanometer portion and a first mirror portion, said first galvanometer portion operably and electrically connected to said image signal generation means;

said first mirror portion serving to reflect said coherent beam of light projected thereon redirecting said coherent beam of light to said varifocal mirror means;

said first galvanometer serving to cause said first mirror portion to move about a first axis where said movement is a function of said image control signals whereby said reflected coherent beam of light is projected upon said varifocal mirror means in a raster scanned pattern towards the formation of said three-dimensional display.

11. The three dimensional laser driven display apparatus according to claim 10 in which said raster generation means includes a second raster assembly interposed between said first raster assembly and said varifocal mirror means including a second galvanometer portion and a second mirror portion, said second galvanometer portion operably and electronically connected to said image signal generation means;

said second mirror portion serving to receive said coherent beam of light projected from said first mirror portion and reflect said coherent beam of light to said varifocal mirror means;

said second galvanometer serving to cause said second mirror portion to move in a second axis where said movement is a function of said image control signals, whereby said coherent beam of light is thus reflected about two axis such that said reflected laser generated image is projected upon said varifocal mirror means in a raster scanned pattern towards the formation of said complete three-dimensional display.

12. The three dimensional laser driven display apparatus according to claim 1 in which said raster generation means comprises a laser generated television image.

13. The invention according to claim 1 in which said three-dimensional laser driven display apparatus includes:

laser means comprising a plurality of colored laser beam emitters; and a plurality of raster generation means corresponding to said colored laser beam emitters, whereby said different colored laser beam emitters may be combined with one another to provide blanking to, in turn, enhance specific characteristics of said three-dimensional display.

14. The three-dimensional laser driven display apparatus according to claim 1 in which said varifocal mirror means comprises a reflective MYLAR stretched over a loudspeaker, thereby acoustically coupling said MYLAR film to said loudspeaker such that when said loudspeaker is driven said reflective MYLAR film vibrates and is accordingly deflected from its rest position causing the image projected onto said reflective MYLAR film to appear at successive planes as a function of the position of said vibrating MYLAR film at each instant in time, the persistence of vision of an observer thereby causing the reflected images at successive planes to fuse together decoding the spatially encoded laser generated image thereby creating said three-dimensional display.

15. The three-dimensional laser driven display apparatus according to claim 14 in which said varifocal mirror means includes an enhancement means wherein:

said loudspeaker includes a plurality of ports operably positioned about the periphery of said loudspeaker, said ports serving to permit certain wavelengths of said coherent beam of light projected upon said MYLAR to pass therethrough;

a plurality of laser detector means operably positioned behind said loudspeaker proximate to said respective ports, said laser detector means serving to detect the presence and condition of said coherent beam of light reflected onto said MYLAR film;

air pressure module means operably connected to the interior of said loudspeaker such that said air pressure module means are capable of producing and sustaining waveforms within said loudspeaker to selectively enhance and modify said laser generated image;

circuit means operably and electrically connected to each said laser detector means and said air pressure module means, said circuit means serving to actuate said air pressure module means to, in turn, produce and maintain a standing wave within said loudspeaker means thereby permitting the enhancement and modification of said three-dimensional display in response to the color, frequency, phase and power of said laser generated image.

16. The three-dimensional laser driven display apparatus according to claim 15 in which said varifocal mirror means further includes lens means operably positioned about said ports to enhance the detection ability of said laser detector means.

17. The three-dimensional laser driven display apparatus according to claim 1 in which said varifocal mirror means comprises:

frame means;

reflective plate means comprising reflective MYLAR film means stretched over said frame means;

infrared source means operably positioned behind said reflective MYLAR film means wherein said infrared source means serves to thermally contract said reflective MYLAR film means and wherein the inherent memory of said reflective MYLAR film means and wherein the inherent memory of said reflective MYLAR film means will serve to cause said MYLAR film means to relax returning to its initial shape and position on said frame means such that the repeated contraction and relaxation of said reflective MYLAR film means will result in its being vibrated thereby causing the reflection viewed in said MYLAR film to appear at successive planes corresponding to the position of said vibration MYLAR film at each instant in time, the persistence of vision of an observer thereby causing the reflected images at successive planes to fuse together decoding the spatially encoded laser generated image creating said three-dimensional image.

18. The three-dimensional laser driven display apparatus according to claim 1 in which ferrite material is operably affixed to the back surface of said reflective plate means to permit manipulation of said laser generated image reflected onto said varifocal mirror means through the application of an electron beam to said ferrite material to create magnetic attenuation of said reflective plate means such that dwell periods are produced in the motion of said reflective plate means which, in turn causes the manipulation of said laser generated image.

19. The three-dimensional laser driven display apparatus according to claim 1 in which said reflective plate means includes phosphor material affixed to the reflective surface of said reflective plate means to permit the observation of images generated by said laser means producing non-visible light.

20. The three-dimensional laser driven display apparatus according to claim 19 in which said phosphor material affixed to said reflective plate means is sensitive to x-ray output.

21. The three-dimensional laser driven display apparatus according to claim 19 in which said phosphor material affixed to said reflective plate means is sensitive to ultraviolet light output.

22. The three-dimensional laser driven display apparatus according to claim 1 in which said varifocal mirror means includes images modification means comprising:
 a plurality of laser detector means operably positioned behind said reflective plate means said laser detection means serving to detect the presence and condition of said coherent beam of light reflected onto said reflective plate means;
 circuit means operably and electrically connected to each of said laser detector means and said motion control means, said circuit means serving to electronically alter the movement of said reflective plate means thereby permitting the modification of said three-dimensional display in response to the frequency, phase and power of said laser generated image.

23. The three-dimensional display apparatus according to claim 22 in which said laser detector means comprise line diodes capable of detecting the presence of a selected color as well as the absence of a selected color.

24. The three-dimensional laser driven display apparatus according to claim 22 in which said laser detector means are positioned forward of said reflective plate means such that said laser detector means may detect said laser generated image as it is reflected off of said varifocal mirror means.

* * * * *